(12) United States Patent
Deforth et al.

(10) Patent No.: US 8,013,059 B2
(45) Date of Patent: Sep. 6, 2011

(54) SYNTHESIS OF HYDROXYLATED POLYORGANOSILOXANES BY HYDROLYSIS/CONDENSATION OF HALOSILANES AND APPARATUS THEREFOR

(75) Inventors: Thomas Deforth, Lyons (FR); Kamel Ramdani, Lyons (FR)

(73) Assignee: Bluestar Silicones France, Lyon Cedex (FR)

( * ) Notice: Subject to any disclaimer, the term of this patent is extended or adjusted under 35 U.S.C. 154(b) by 954 days.

(21) Appl. No.: 11/153,618

(22) Filed: Jun. 16, 2005

(65) Prior Publication Data

US 2005/0288473 A1    Dec. 29, 2005

Related U.S. Application Data

(63) Continuation of application No. PCT/FR03/03615, filed on Dec. 8, 2003.

(30) Foreign Application Priority Data

Dec. 16, 2002  (FR) ...................................... 02 15944

(51) Int. Cl.
*C08G 77/06* (2006.01)

(52) U.S. Cl. ............ 524/837; 528/10; 528/12; 422/132; 422/135; 422/225

(58) Field of Classification Search ........................ None
See application file for complete search history.

(56) References Cited

U.S. PATENT DOCUMENTS

| | | | | |
|---|---|---|---|---|
| 2,758,124 A | * | 8/1956 | Schwenker | 556/450 |
| 3,373,138 A | * | 3/1968 | Brown | 528/42 |
| 6,180,811 B1 | * | 1/2001 | Bramer et al. | 556/460 |
| 7,109,268 B2 | * | 9/2006 | Creutz et al. | 524/588 |

* cited by examiner

*Primary Examiner* — Marc S Zimmer
(74) *Attorney, Agent, or Firm* — Buchanan Ingersoll & Rooney PC

(57) ABSTRACT

A method for hydrolyzing/condensing, by acid catalysis, silanes bearing hydrolyzable groups, preferably halogenosilanes and more preferably still chlorosilanes, in a polyphase reaction medium (preferably biphasic), includes contacting the silanes bearing the hydrolyzable groups with water, buffer solution and neutralizing agent, while stirring, then in separating the aqueous phase from the organic phase, which contains the hydrolysis/condensation products, namely hydroxylated polyorganosiloxanes; such method is characterized by (a) employing intensively stirring means producing, in the reaction medium, an agitation at least equivalent to that induced by a shearing corresponding to that provided by a rotor whereof the peripheral speed is not less than 8 m.s$^{-1}$, preferably not less than 10 m.s$^{-1}$, and more preferably still ranging between 15 and 20 m.s$^{-1}$, enabling thus organic phase droplets to be formed, of $d_{32}$ less than 500 μm; and (b) ensuring that the silanes/aqueous phase mass fraction is not less than 0.05, preferably not less than 0.10, and more preferably still ranging from 0.5 to 2.0.

18 Claims, 2 Drawing Sheets

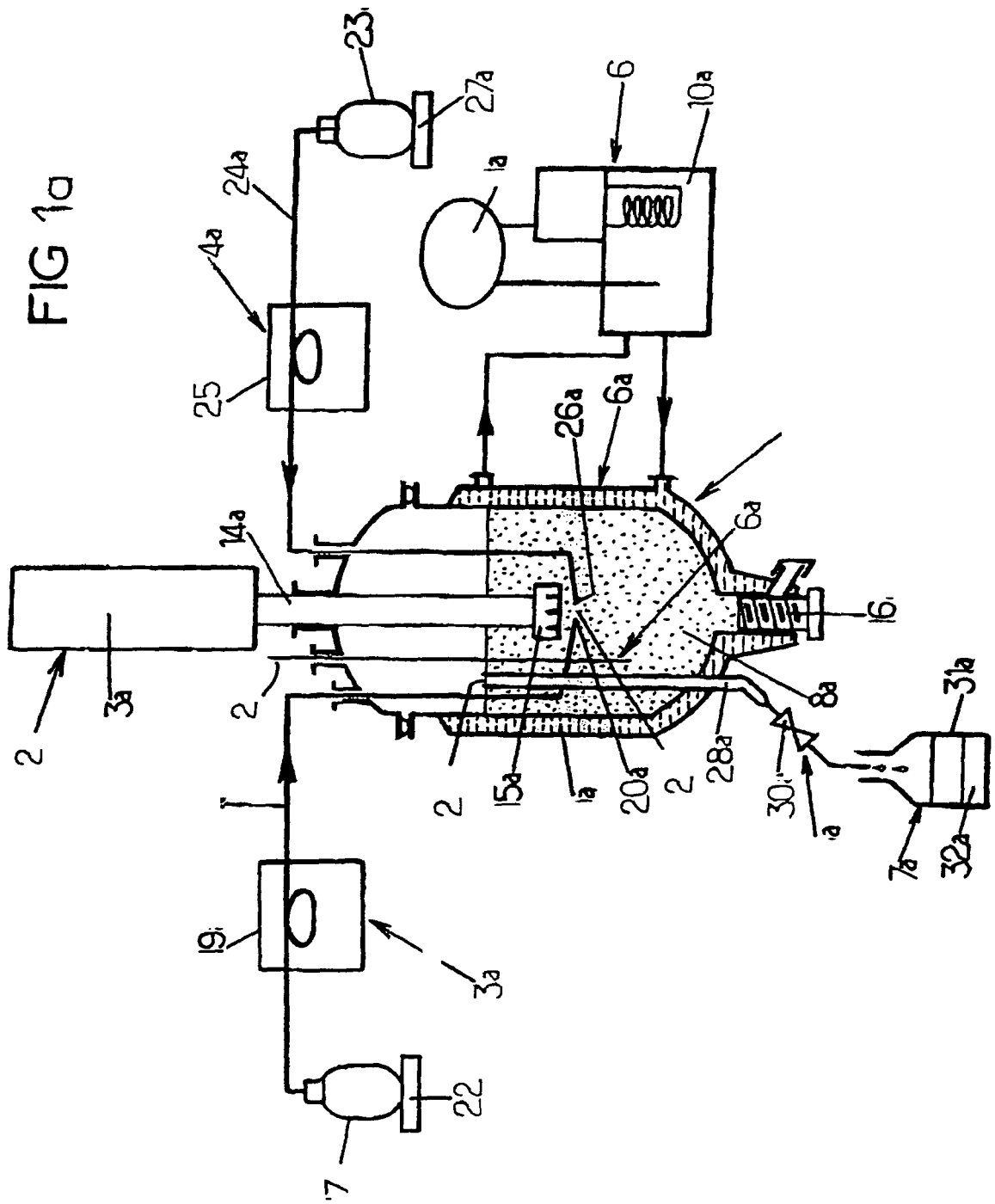

SYNTHESIS OF HYDROXYLATED POLYORGANOSILOXANES BY HYDROLYSIS/CONDENSATION OF HALOSILANES AND APPARATUS THEREFOR

CROSS-REFERENCE TO PRIORITY/PCT APPLICATIONS

This application claims priority under 35 U.S.C. §119 of FR 02/15944, filed Dec. 16, 2002, and is a continuation of PCT/FR 2003/003615, filed Dec. 8, 2003 and designating the United States (published in the French language on Jul. 29, 2004 as WO 2004/063251 A1; the title and abstract were also published in English), each hereby expressly incorporated by reference and each assigned to the assignee hereof.

BACKGROUND OF THE INVENTION

1. Technical Field of the Invention

The present invention relates to the synthesis of hydroxylated polyorganosiloxanes, in particular of linear polydiorganosiloxanes comprising silanol endgroups (≡SiOH) of relatively low molar mass. These silicones (e.g., $\alpha,\omega$-diOH polydimethylsiloxane) are useful in particular as dispersants in the context of the manufacture of silicone elastomers, such as are found in crosslinked silicone coatings (e.g., release paper), or else in room temperature vulcanizable silicone emulsions (polycondensation) to form mastics or other sealants.

The present invention thus relates to a process for the hydrolysis/condensation of halosilanes in a multiphase (preferably two-phase) reaction medium, this process being of the type of those entailing mixing the halosilanes, water and buffer together with stirring and in then separating the aqueous phase and the organic phase, which comprises the hydrolysis/condensation products, namely hydroxylated polyorganosiloxanes.

The present invention also relates to apparatus for carrying out this process for the hydrolysis/condensation of halosilanes.

2. Description of Background and/or Related and/or Prior Art

As is indicated in the scientific and technical literature, for example in the text by Noll, "Chemistry and Technology of Silicones" (published by Academic Press, 1968), two well known routes exist for the synthesis of polydiorganosiloxanes having ends carrying SiOH units:

1) ring opening of cyclic polyorganosiloxanes, octamethyltetrasiloxane ($D_4$) or heptamethyltrisiloxane ($D_3$), and/or redistribution of $D_2$ siloxyl units: —$R_2SiO$—$O_{2/2}$, catalyzed by acids or bases;

2) hydrolysis of ≡SiZ units (Z=halogen or alkyl) in an aqueous phase, followed by condensation.

Generally, long chain oils comprising silanol ends (low level of ≡SiOH (w/w), that is to say <1%) are manufactured industrially by redistribution of short chains starting from cyclic polyorganosiloxanes of $D_3$ and/or $D_4$ type.

Short chain oils with a high concentration of ≡SiOH are obtained conventionally by hydrolysis/condensation of silanes comprising ≡SiZ units (Z=halogen or alkyl) in an organic/aqueous two-phase medium.

The present invention more especially relates to the technology for the hydrolysis/condensation of halosilanes, for example of chlorosilanes.

This technology has long been known.

By way of illustration, mention may be made of U.S. Pat. No. 2,661,348, which discloses a process for the preparation of a polysiloxane resin which entails making use of a solution comprising an organotrihalosilane (trichloromethylsilane) in an inert halogenated organic solvent (trichloroethylene, tetrachloroethane, tetrachloroethylene, and the like). This organic solution of halosilanes is contacted with water in an amount sufficient to permit the complete hydrolysis of the organotrihalosilane, in order, finally, to extract the nonaqueous organic phase comprising the polysiloxane resin.

This process is intended to make it possible to solve a recurrent technical problem during the hydrolysis/condensation of halosilanes, namely that, with polyorganosiloxanes substituted by lower alkyls (methyls), the hydrolysis and the condensation occur simultaneously. This results in uncontrolled polycondensation, leading to the formation of long linear polysiloxane entities and of cyclic polysiloxane entities. Insoluble silicone gels thus appear in the reaction medium, which gels render the silicone products obtained by hydrolysis/condensation of halosilanes unsuitable for any subsequent use in any industrial and commercial application. The fact of employing an inert organic solvent, as provided in U.S. Pat. No. 2,661,348, makes possible better dissolution of the hydrolyzed silicone product in the organic phase, while the acid (HCl) which promotes hydrolysis and all the hydrophilic products remain in the aqueous phase. Success is thus more or less achieved in preventing the reaction from becoming uncontrolled. In addition, the choice of a solvent with a density of greater than 1.1 (halogenated solvent) promotes and facilitates the separation of the two phases without the formation of an oil-in-water emulsion.

According to U.S. Pat. No. 2,661,348, the reactor is equipped with a stirrer but the stirring parameters are not presented as critical.

As indicated above, the starting materials for the hydrolysis/condensation can be alkoxysilanes instead of halosilanes. Thus, EP-A-1-052,262 discloses the hydrolysis/condensation of one mole of dimethoxydimethylsilane by two moles of water, the reaction medium being adjusted to a pH of 3.4 using hydrochloric acid. This stoichiometric two-phase system is vigorously stirred at ambient temperature. Stirring is continued for a period of time. The reaction mixture becomes homogeneous and a $KH_2PO_4/A_2HPO_4$ buffer system is subsequently added thereto so as to adjust the pH to 6.8. After stirring for a few minutes, the reaction medium is subjected to a vacuum distillation operation to remove the water and the volatile substances (methanol).

It will be seen from this document that the hydroxylated polyorganosiloxanes obtained have degrees of polymerization which are slightly greater than 2 and which have a tendency to increase on storage (instability).

In addition, this document does not particularly emphasize the stirring conditions, any more than the silane/aqueous phase ratio, from the viewpoint of the performance expected for the hydrolysis/condensation process under consideration.

In reality, the process according to EP-A-1-052,262 does not guarantee good control of the reaction for the hydrolysis/condensation of silanes comprising hydrolyzable units (≡-Si-halogen, ≡-Si-alkoxy or ≡-Si—OH).

Finally, this process is not the most economic and also presents the disadvantage of being ecotoxic.

SUMMARY OF THE INVENTION

In a primary aspect, the present invention provides a process for the hydrolysis/condensation of halogenated, alkoxylated or hydroxylated silanes in which the reaction kinetics for hydrolysis and for condensation are fully under control, such as to bring under control the length of the silicone chain.

The present invention also provides an economic and simple process for the hydrolysis/condensation of silanes and in particular of halosilanes which makes it possible to produce hydroxylated polyorganosiloxanes with a short chain and thus with an OH level of greater than 2%, while benefiting from excellent stability on storage.

This invention also provides a process for the hydrolysis/condensation of silanes and in particular of halosilanes which meets all the requirements "of industrial applicability", namely, in particular, availability, accessibility and low cost of the starting materials, ease of implementation, low cost price, absence of dangerousness and of ecotoxicity (no organic solvents), speed and possibility of operating continuously, inter alia.

The present invention also provides a process for the synthesis of hydroxylated polyorganosiloxanes, in particular polyorganosiloxanes hydroxylated at their ends, characterized by an OH level of greater than or equal to 2%, preferably of greater than or equal to 5% and more preferably still of greater than or equal to 10%.

This invention also provides a process for the hydrolysis/condensation of silanes and in particular of halosilanes in which the separation between the organic phase, comprising the finished products (hydroxylated POSs), and the aqueous phase, comprising the reactants (acid catalyst/water/buffer), is easy to carry out.

Too, the present invention also provides simple, economic and efficient apparatus for carrying out the process described above.

Thus, the present invention features a process for the hydrolysis/condensation, by acid catalysis, of silanes carrying hydrolyzable groups, preferably halosilanes and more preferably still chlorosilanes, in a multiphase reaction medium (preferably a two-phase reaction medium), this process comprising contacting the silanes carrying hydrolyzable groups with water and buffer, with stirring, and then separating the aqueous phase from the organic phase, which comprises the hydrolysis/condensation products, namely hydroxylated polyorganosiloxanes, wherein:

a) intensive stirring means are utilized capable of producing, in the reaction medium, stirring at least equivalent to that induced by a shear corresponding to that provided by a rotor having a peripheral speed at least equal to 8 m.s$^{-1}$, preferably to 10 m.s$^{-1}$ and more preferably still of between 15 and 30 m.s$^{-1}$, and thus forming droplets of organic phase with a $d_{32}$ of less than 500 μm; and b) establishing for the silanes/aqueous phase fraction by weight to be greater than or equal to 0.05, preferably greater than or equal to 0.10 and more preferably still of between 0.50 and 2.00.

DETAILED DESCRIPTION OF BEST MODE AND SPECIFIC/PREFERRED EMBODIMENTS OF THE INVENTION

More particularly according to the present invention, the importance of the operational parameters have now been demonstrated, which are:

a) the stirring in the two-phase hydrolysis/condensation system, and b) the dilution of the organic phase in the aqueous phase of said reaction medium.

The process according to the invention makes possible the manufacture of hydroxylated PolyOrganoSiloxanes (POSS) and in particular of β,ω-OH polydialkyl (e.g., methyl) siloxanes while fully controlling the level of ≡SiOH units, for example from 0.5 to 18% by weight, by varying the parameters a) and b) referred to above, which gives access to very short α,ω-OH POSs, such as, for example, $M^{OH}D_nM^{OH}$ (n=2 to 4), hitherto very difficult to obtain and to stabilize.

In addition to linear α,ω-OH POSs, the process according to the invention also produces limited amounts of the cyclic compounds.

The process according to the invention involves a two-phase liquid/liquid reaction between an organic phase laden with hydrolyzable silanes and an aqueous phase (preferably a basic aqueous phase) laden with salt.

Experimentally, the size of an emulsion is represented by a size distribution. The mean diameter of the drops in a dispersion is generally given by the Sauter mean diameter, $d_{32}$. The value of the Sauter diameter results from the equilibrium between phenomena of rupture, related to the local turbulence in the vicinity of the stirrer, and phenomena of coalescence in the peripheral regions of moderate turbulence and shear. The Sauter mean diameter is often taken as proportional to the maximum stable diameter [Zhou and Kresta, 1998, *Chemical Engineering Science*, Vol. 53, No. 11).

In accordance with one of the essential characteristics of the invention, carrying out sufficient stirring a) in terms of local dissipated power and in terms of shear determines the ad hoc micromixing conditions and thus, in the end, the formation of the droplets of dispersed organic phase which have a size small enough to make possible control of the reaction.

The factor b) for sufficiently strong dilution of the dispersed organic phase in the aqueous phase makes it possible to limit, in an altogether significant way, the risk of coalescence of the droplets and thus to control the level of OH by the length of the siloxane chains.

According to a preferred embodiment of the process according to the invention, the neutralizing agent comprises at least one base preferably selected from among those of formula ROH with R representing an ionic entity resulting from an element belonging to the family of the alkali metals (Group IA of the Periodic Table) and more preferably still from the group consisting of NaOH, LiOH and CsOH.

According to another preferred embodiment of the process according to the invention, the buffer is based on carbonates and/or on phosphates and/or on borates and/or on nitrates, inter alia. Preferably, this buffer is formed in situ in the reaction medium after introduction into the latter of at least one carbonate and/or one phosphate and/or one borate and/or one nitrate, advantageously one alkali metal (Group IA of the Periodic Table) carbonate and/or phosphate and/or borate and/or nitrate and more advantageously still one carbonate resulting from the group consisting of $Na_2CO_3$, $Li_2CO_3$ and $Cs_2CO_3$.

The neutralizing agent composed of an aqueous solution of the base NaOH and the buffer obtained in situ by introduction of $Na_2CO_3$ into the reaction medium are embodiments favored in practice.

The neutralizing agent and the buffer make it possible to control the polycondensation through the control of the acidity, which, to be specific, acts as catalyst.

Thus, in accordance with the process according to the invention, it is arranged for the pH of the reaction medium to be stabilized between 7 and 12, preferably between 9 and 11.

In order to improve the separation of the aqueous phase and of the organic phase, it proved to be entirely appropriate, in accordance with the invention, to arrange for the aqueous phase to have a saline concentration such that its density is greater than 1.

As regards the nature of the starting materials employed, it may be generally specified that the starting silanes are preferably selected from among those having the following formulae:

Monosilanes:

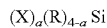  (I)

Polysilanes:

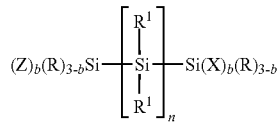  (II)

in which:
- X independently represents a halogen, alkoxy, or hydroxyl group;
- Z independently represents a hydrolyzable group preferably selected from the group consisting of halogens, OR' radicals and OH, halogens being very especially favored;
- R, $R^1$ and R' independently represent an alkyl radical, a cycloalkyl, an aryl, an arylalkyl, an acyl, an alkenyl or an alkynyl radical;
- a, b and n are positive integers, a=1-4, b=1-3 and n=1-100.

The term "alkyl" denotes an optionally substituted (e.g., by one or more alkyls), saturated, linear or branched, hydrocarbon chain preferably of 1 to 10 carbon atoms, for example of 1 to 8 carbon atoms, better still of 1 to 7 carbon atoms.

Examples of alkyl radicals are in particular methyl, ethyl, isopropyl, n-propyl, tert-butyl, isobutyl, n-butyl, n-pentyl, isoamyl and 1,1-dimethylpropyl.

The term "cycloalkyl" is understood to mean a saturated, mono- or polycyclic, preferably mono- or bicyclic, hydrocarbon radical preferably having from 3 to 10 carbon atoms, better still from 3 to 8. The term "'saturated polycyclic hydrocarbon' radical" is understood to mean a radical having two or more rings attached to one another via σ bonds and/or fused in pairs. Examples of polycyclic cycloalkyl radicals are adamantane and norbornane. Examples of monocyclic cycloalkyl radicals are cyclopropyl, cyclobutyl, cyclopentyl, cyclohexyl, cycloheptyl and cyclooctyl radicals.

The expression "aryl" denotes a monocyclic or polycyclic and preferably monocyclic or bicyclic aromatic hydrocarbon radical having from 6 to 18 carbon atoms. It must be understood that, in the context of the invention, the term "polycyclic aromatic radical" is understood to mean a radical exhibiting two or more aromatic nuclei fused (ortho-fused or ortho- and peri-fused) with one another, that is to say exhibiting, in pairs, at least two carbons in common. Said aromatic hydrocarbon radical ("aryl") is optionally substituted, for example by one or more $C_1$-$C_3$ alkyls, one or more halogenated hydrocarbon radicals (e.g., $CF_3$), one or more alkoxy radicals (e.g., $CH_3O$) or one or more hydrocarbon radicals comprising one or more ketone units (e.g., $CH_3CO$—).

Mention may be made, as examples of aryl, of the phenyl, naphthyl, anthryl and phenanthryl radicals.

The expression "arylalkyl" denotes an alkyl radical as defined above substituted in its hydrocarbon chain by one or more aryl radicals, the aryl radical being as defined above. Examples thereof are benzyl and triphenylmethyl.

The term "acyl" is understood to mean an $R^o$—CO— radical wherein $R^o$ represents an alkyl as defined above, or else an Ar—CO— radical where Ar represents an aryl radical as defined above, or else an arylalkyl radical in which "aryl" and "alkyl" are as defined above and in which the aryl moiety is optionally substituted, e.g., by an alkyl radical.

The term "alkenyl" is understood to mean an unsaturated, substituted or unsubstituted, linear or branched, hydrocarbon chain having at least one olefinic double bond and more preferably a single double bond. Preferably, the alkenyl radical has from 2 to 8 carbon atoms, better still from 2 to 6. This hydrocarbon chain optionally comprises at least one heteroatom, such as O, N or S.

Preferred examples of alkenyl radicals are the vinyl, allyl and homoallyl groups.

The tert "alkynyl" is understood to mean, according to the invention, an unsaturated, substituted or unsubstituted, linear or branched, hydrocarbon chain having at least one acetylenic triple bond and more preferably a single triple bond. Preferably, the alkynyl radical has from 2 to 8 carbon atoms, better still from 2 to 6 carbon atoms. Mention may be made, by way of examples, of the acetylenyl radical and the propargyl radical. This hydrocarbon chain optionally comprises at least one heteroatom, such as O, N or S.

More preferably still, X=halogen, for example chlorine.

On the latter assumption, the hydrolysis generates a haloacid, to be specific HCl, which catalyzes the condensation and which thus has to be neutralized for the purposes of controlling the condensation.

Advantageously, the molar ratio of the acid generated by the silane to the neutralizing agent composed of the base is, in this preferred embodiment, equal to 1.

It is preferable for the temperature applied for the hydrolysis/condensation to be a set temperature T such that:
$T \leq 90°$ C.,
preferably $T \leq 80°$ C.,
and, more preferably still, $20°$ C.$\leq T \leq 60°$ C.

The pressure conditions suitable for the process according to the invention are the conditions of standard atmospheric pressure.

According to the invention, the hydrolysis/condensation reaction produces hydroxylated polyorganosiloxanes having a level of OH by weight, $t_{OH}$, as defined below, as % w/w with respect to the total weight of the hydroxylated polyorganosiloxanes obtained:
$2 \leq t_{OH} \leq 20$
preferably, $5 \leq t_{OH} \leq 15$.

According to an advantageous embodiment of the invention, the α,ω-OH POSs obtained are stable over time.

According to an advantageous procedure, it is possible to restrict the residence time of the reactive medium in the reactor to 1 minute or less.

The process according to the invention can also be carried out continuously, semicontinuously or batchwise.

Naturally, the continuous mode is particularly advantageous industrially for obvious reasons of improvement in the productivity.

Thus, this continuous mode is a preferred embodiment of the process according to the invention in which, preferably, a hydrolysis loop is involved.

In this more especially selected form of the preferred continuous embodiment involving a hydrolysis loop, the two-phase organic phase/aqueous phase mixture is withdrawn continuously. This is because, in a hydrolysis loop, the entering reactive volumes drive out and replace corresponding volumes of mixture of the products obtained at the end of the reaction. The stream is generated by a circulation pump included in the loop, which also comprises one or more inlets for reactants (to be specific, one for the organic phase (halosilanes) and one for the aqueous phase (water/buffer system))

and one or more outlets for the reaction products at the end of the loop. For further details, reference may be made, for example, to the following papers:

O. Bolzern and J. R. Bourne, "Rapid Chemical Reactions in a Centrifugal Pump", *Chem. Eng. Res. Des.*, Vol. 63,1985;

Y. Murakami, T. Hirose, S. Ono, T. Nishijima, "Mixing Properties in a Loop Reactor", *Journal of Chemical Engineering of Japan*, Vol.15, 1982.

In this preferred embodiment, the intensive stirring means advantageously comprise the circulation pump of the hydrolysis loop, which can, for example, be a pump, for example a centrifugal pump.

Still according to this preferred embodiment of the process of the invention, the hydrolysis loop makes it possible to continuously withdraw the two-phase mixture, care having been taken to arrange for the residence time of the organic and aqueous phases feeding the reaction medium always to be markedly greater than the reaction time. In point of fact, insofar as the reaction is instantaneous and located in the region of high dispersion generated by the circulation pump (and in an optional additional static mixer), residence times of a few milliseconds to a few seconds have, for example, proved to be sufficient.

In order to obtain the shear characteristics specific to the invention, it is preferable for at least one of the outlets of the respective feed means for organic phase and for aqueous phase to be positioned as close as possible to the intensive stirring means and in particular at the closest to the region with the greatest shear which it generates.

According to another embodiment of the process according to the invention, of batchwise type, the following forms are selected:
- the intensive stirring means are of the type of those coming under "rotor/stator" technology,
- provision is made for a feed of halosilanes (organic phase) and a feed of water/buffer system (aqueous phase), these two feeds emerging in the region of maximum turbulence generated by the intensive stirring means in the reaction medium,
- provision is also made for sequential or continuous withdrawal of the two-phase organic phase/aqueous phase mixture generated by the intensive stirring means, so that the residence time is greater than or equal to the reaction time, preferably of between a few seconds and a few minutes.

In this batchwise mode, the intensive stirring means employed comprise at least one mixer or one dispersing device of rotor/stator type with a variable rotational speed. The variable speed makes it possible to adjust the shearing, and thus the size of the droplets, according to the level of OH targeted in the polyorganosiloxane.

This rotor/stator technology guarantees high shearing of the reaction medium. In practice, it can be a stirrer of the type of that sold by IKA under the Ultra-Turrax® trademark. This type of stirrer comprises rotor/stator elements composed of sets of conically-shaped parts with interlocking teeth.

Rotor/stator stirrers, such as the Ultra-Turrax®, make it possible to strongly shear the reaction medium in order to promote the formation of very fine droplets (of the order of a few tens of microns). This shearing is characterized by the peripheral speed of the rotor (equivalent to the peripheral speed for a conventional stirrer).

The control of the quality of the mixing makes it possible to scan a wide spectrum of levels of OH for the hydroxylated POS targeted (between 1 and 20%, for example).

One of the specific features of this batchwise mode of the process according to the invention is the positioning of the outlet of the respective means for feeding with organic phase and with aqueous phase in the reaction chamber in the immediate vicinity of the intensive stirring means (rotor/stator) in the region where the turbulence is maximum during stirring. This positioning of the reactant outlets where the shearing is strongest is advantageously precise so that the organic phase/aqueous phase mixing takes place immediately after the entry of said phases into the reaction medium and so that the organic phase is put into the disperse state as rapidly as possible in the form of very small droplets (micromixture).

In other words, it is preferable for the mixing of the two reactive phases to take place as close as possible to the rotor where the power dissipated is at its strongest.

According to alternative forms of the embodiments defined above, the intensive stirring means (or intensive mixers) might comprise one or more devices known to one skilled in this art which are appropriate for the shearing treatments targeted above. They might, for example, be impact jet stirrers, micromixers, static mixers, mills, ultrasonic stirrers or pumps (e.g., centrifugal pumps).

In the preferred hydrolysis loop according to the invention, the most suitable stirring means are, for example, pumps (e.g., centrifugal pumps) and/or mixers of the type of those with a rotor/stator and/or static mixers.

The adjusting of the parameters of the process according to the invention defined above must make it possible to carry out the hydrolysis/condensation reactions before the occurrence of coalescence of the droplets of dispersed organic phase. It is therefore very important in this respect to maximize the time necessary for the coalescence by operating in a very dilute medium and/or by adding at least one surfactant to the mixture. Naturally, care should be taken that the phases can still be easily separated.

The two-phase aqueous phase/organic phase mixture which has reacted and which has exited from the reaction chamber is subjected to separation, for example by settling. All the separation techniques known to one skilled in this art are applicable in this optional stage of the process according to the invention. The separation technique can, for example, be a centrifuging and preferably a separation by gravity.

It is subsequently possible to remove, from the organic phase, volatile compounds and traces of residual water, so as to recover an organic phase laden with hydroxylated polyorganosiloxanes with high levels of hydroxylation (short chains). In the way known per se, distillation (batchwise or continuous) can be used for this removal stage.

Thus, by virtue of the process according to the invention, which provides for the use of very high shear stirring, making possible the formation of silane droplets with a size, for example, of less than 500 μm, with a silanes/aqueous phase fraction by weight of, e.g., between 0.05 and 1 and a concentration by weight of ≡SiOH advantageously of greater than or equal to 10%, makes it possible to continuously synthesize hydroxylated silicones with a variable and fully controlled level of OH.

The present invention also features apparatus for carrying out the process as defined above.

This apparatus is characterized in that it essentially comprises:
1. at least one hydrolysis/condensation reactor,
2. intensive stirring means equipping the reactor,
3. means for feeding the reactor with organic phase,
4. means for feeding the reactor with aqueous phase,
5. means for withdrawing the two-phase reaction medium after hydrolysis/condensation,
6. means for maintaining the temperature of the reaction medium in the reactor, 7. and an organic phase/aqueous phase separation device.

According to a preferred continuous embodiment of the apparatus of the invention:
- the hydrolysis/condensation reactor is a loop reactor,
- the intensive stirring means comprises at least the circulation pump of the loop reactor and optionally at least one other intensive stirring means of the type of those with a rotor/stator or of the static mixer type, and
- the withdrawal means are composed of the outlet of the loop.

Advantageously, at least one of the outlets of at least one (preferably both) of the means for feeding 3 and/or 4 with organic and/or aqueous phase are positioned such that the organic phase and the aqueous phase are introduced and/or are mixed with one another in the stirring region of the loop where the power dissipated is at its strongest.

According to an alternative batchwise embodiment of the device of the invention, the intensive stirring means comprise at least one rotor/stator combination provided with conically-shaped parts with interlocking teeth.

It is also entirely appropriate, in this batchwise device, for at least one of the outlets of at least one (preferably both) of the means for feeding the reactor with organic phase and the means for feeding the reactor with aqueous phase to comprise, respectively either, an outlet positioned in the vicinity of the rotor/stator of the stirring means, such that the organic phase and the aqueous phase flow into and/or are mixed with one another in the region where the power dissipated is at its strongest.

The present invention will be better understood in the light of the illustrative examples which follow and which describe:
- a preferred continuous embodiment of the process for the hydrolysis/condensation of chlorosilanes according to the invention, using a preferred embodiment of a continuous device for the synthesis of hydroxylated POSs with a high hydroxyl level, and
- a batchwise embodiment of the process for the hydrolysis/condensation of chlorosilanes according to the invention, using an alternative embodiment of a batchwise device for the synthesis of hydroxylated POSs with a high hydroxyl level.

BRIEF DESCRIPTION OF THE DRAWINGS

This detailed description of the invention is made with reference to the appended Figures of Drawing, in which:

FIG. 1a represents a diagram of a second embodiment of an apparatus of the invention used in the examples;

The appended FIG. 1 shows the preferred device according to the invention, which comprises a hydrolysis/condensation reactor of loop reactor type denoted by the reference 1, intensive stirring means composed of the circulation pump 2 of the loop, means for feeding 3 the loop 1 with organic phase, means for feeding 4 the loop 1 with aqueous phase, a loop outlet 5, equivalent to the means for withdrawing the two-phase reaction medium from the loop 1 after hydrolysis/condensation, means 6 for maintaining the temperature included in the loop 1, and a device 7 for organic phase/aqueous phase separation.

Figure 1:
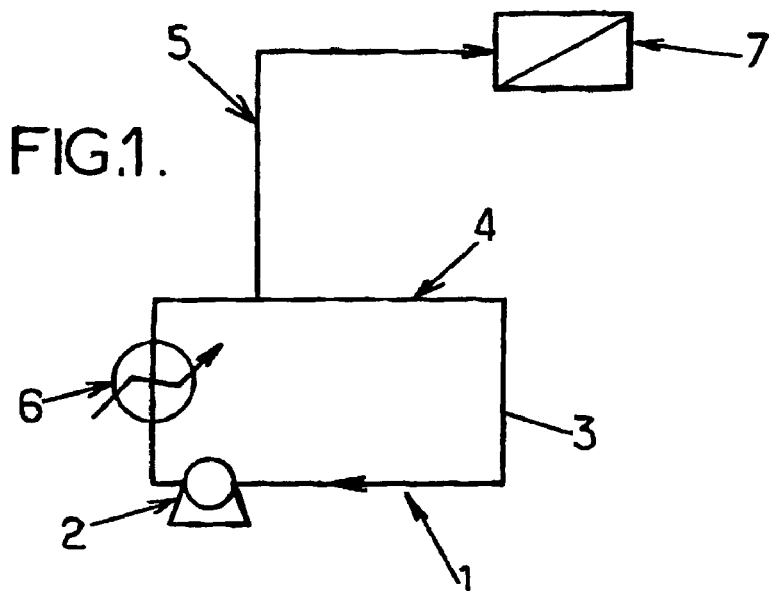
FIG. 1 represents a diagram of a first preferred embodiment of apparatus of the invention used in the examples.

The reactor 1 is thus composed of a pipe, as a loop, provided with thermal insulation (jacket). This pipe 1 is connected to the organic phase inlet pipe 3, the aqueous phase inlet pipe 4 and the outlet pipe 5 for the reaction medium at the end of the reaction. Circulation of the reaction medium in the loop 1 is provided by the circulation pump 2 which is, for example, a centrifugal pump. The heat exchanger 6 makes possible the regulation of the temperature in the loop reactor 1.

The heat exchanger 6 can, for example, be a thermostatically-controlled bath of a heat-exchange fluid (e.g., water) circulating in the jacket equipping the pipe constituting the loop 1. The reaction medium outlet 5 emerges in the settling tank 7 composed of any appropriate device known to one skilled in this art.

The loop reactor 1 can have another intensive stirring means composed, for example, of an intensive static mixer, if the shearing created by the pump 2 is inadequate.

The circulation pump determines the circulation flow rate in the loop reactor 1. This flow rate can, for example, be between 20 and 60 $m^3/h$, preferably between 35 $m^3/h$ and 45 $m^3/h$.

The organic phase and the aqueous phase are to be injected into the loop reactor 1 via the inlets 3 and 4 respectively. It should be noted that the inlet 3 for organic phase is positioned as close as possible to the shearing generated by the pump 2.

The appended FIG. 1a represents the apparatus employed in the examples. This device comprises a hydrolysis/condensation reactor denoted by the reference 1a, intensive stirring means denoted by the reference 2a which equip the reactor 1a, means for feeding 3a the reactor 1a with organic phase, means for feeding 4a the reactor 1a with aqueous phase, means for withdrawing 5a the two-phase reaction medium from the reactor 1a after hydrolysis/condensation, means 6a for maintaining the temperature of the reaction medium 8a present in the reactor, and a device 7a for organic phase/aqueous phase separation, these two phases being withdrawn via the means 5a.

The reactor 1a comprises a jacket 9a in which the fluid for maintaining the temperature, delivered by other elements 10a, 11a, 12a constituting the means 6a for maintaining the temperature, circulates. The element 10a is a thermostatically-controlled bath of a heat-exchange fluid (for example water) circulating in the jacket. The element 11a of the means 6a is a device for adjusting the set temperature. This device 11a is used in combination with a probe 12a for measuring the temperature of the reaction medium 8a, in order to be able to continuously regulate the temperature.

The intensive stirring means 2a are composed of an Ultra-Turrax® mixer manufactured and sold by IKA and comprising a variable speed motor unit 13a. This motor unit 13a is connected to a drive shaft 14a, at the free end of which is found a rotor/stator combination comprising a set of conically-shaped parts with interlocking teeth. The Ultra-Turrax® stirrer 2a is positioned so that, on the upper part of the reactor 1a, a portion of the shaft 14a and the rotor/stator combination 15a are immersed in the reaction medium 8a.

The reactor 1a is also equipped in its lower part with a drain plug 16a.

The means for feeding 3a with organic phase comprise a container 17a filled with organic phase which is, as it happens, composed of dimethyldichlorosilane ($Me_2SiCl_2$), e.g., said means 3a also comprise a feed pipe 18a which makes it possible to convey the organic phase ($Me_2SiCl_2$) from the container 17a into the reaction medium 8a of the reactor 1a by virtue of the action of a pump 19a. The outlet 20a of the pipe for feeding 19a with organic phase and the outlet 26a of the pipe for feeding 24a with aqueous phase are positioned as close as possible to the rotor/stator 15a so as to be introduced into the region of greatest turbulence denoted by the reference 21a.

In addition, it is preferable for the pipes 19a and 24a to be designed so that the distances between the outlets 20a and 26a and the region of greatest turbulence 21a are fixed.

The container 17a for the organic phase rests on a balance 22a which allows the level of liquid inside said container to be measured.

Like the means for feeding 3a with organic phase, the means for feeding 4a with aqueous phase comprise a container 23a for the aqueous phase (water/NaOH/Na$_2$CO$_3$) and a feed pipe 24a equipped with a pump 25a which makes it possible to deliver the aqueous phase to the region of high turbulence 21a of the reaction medium 8a via the outlet orifice 26a. The container for the aqueous phase 23a rests on a balance 27a which allows the residual level of aqueous phase to be measured.

The withdrawal means 5a comprise a withdrawal pipe 28a, the open up per end 29a of which is flush with the upper level of the reaction medium 8a in the reactor 1a. This withdrawal pipe 28a is connected via a pipe equipped with a valve 30a to a device 7a, as it happens a container for collecting and separating the two-phase aqueous phase/organic phase mixture which has reacted by hydrolysis/condensation.

In order to further illustrate the present invention and the advantages thereof, the following specific examples are given, it being understood that same are intended only as illustrative and in nowise limitative. In said examples to follow, all parts and percentages are given by weight, unless otherwise indicated.

EXAMPLES

I—Continuous Reactor Examples—FIG. 1

Example 1

The reaction conditions employed are as follows:
Volume of the reactor=40 liters,
Organic phase flow rate=100 kg/h,
Aqueous phase flow rate=1000 kg/h,
T=40° C.,
P=1 atm.
The following reactants are employed in the loop reactor of FIG. 1:
Organic phase: dimethyldichlorosilane.
Aqueous phase: aqueous solution comprising 10% of sodium hydroxide and 3.3% of sodium carbonate.
Make-up water for varying the dilution of the organic phase; this water is preferably demineralized in order to limit the interactions with the salts present in the aqueous phase.

The example presents the impact of the amount of make-up water and thus of the fraction by weight of organic phase on the quality of the oil obtained (in terms of OH level).

TABLE 1

| Tests | Organic phase flow rate | Aqueous phase flow rate (kg/h) | Demineralized water flow rate (kg/h) | OH level by weight |
|---|---|---|---|---|
| 1.1 | 100 | 575 | 250 | 8.10 |
| 1.2 | 100 | 575 | 330 | 9.00 |
| 1.3 | 100 | 575 | 440 | 10.50 |

Example 2

An in-line disperser of rotor/stator type was added to the loop reactor presented in FIG. 1. The organic phase is injected into the mixing chamber of the disperser, region of high dissipated power. The process is then carried out more than once while varying the rotational speed of the rotor. The operating conditions correspond to those of test 1.3.

TABLE 2

| Tests | Rotational speed | OH level by weight |
|---|---|---|
| 1.4 | 2500 | 9.20 |
| 1.5 | 3000 | 10.00 |
| 1.6 | 3500 | 12.90 |

II—Batchwise Apparatus of FIG. 1a:

1/General Methodology 1.1—Materials employed:

The aqueous phase comprises a buffer solution obtained from NaOH and from Na$_2$CO$_3$ dissolved in demineralized water. The amounts employed and the operating conditions are reported in the following Table 3.

The organic phase is composed of Me$_2$SiCl$_2$ manufactured and sold by Rhodia Silicones.

1.2—Apparatus:

The apparatus used is that represented in the appended FIG. 1a described above.

1.3—General procedure:

According to the examples, the temperature of the thermostat is adjusted to 40° C. or to 45° C.

The stirring conditions are given by the stirring speed of the Ultra-Turrax® in revolutions/minute. This speed can be varied according to the examples.

The withdrawal period is determined according to the residence time.

Separation is carried out in the settling tank 7 after withdrawal of the two-phase mixture which has reacted.

The settling tank 7 comprises a supernatant 31 composed of the hydroxylated siloxane organic phase and a residue 32 composed of the aqueous phase laden with the neutralization salt and the NaHCO$_3$/Na$_2$CO$_3$ buffer.

The oil which is obtained is subsequently analyzed by near IR spectroscopy and compared with a control comprising 10% (w) of SiOH.

2/Examples 3 to 9

The operating conditions of the various tests are summarized in the following table, which also gives the OH level obtained.

TABLE 3

| | Example 3 | Example 4 | Example 5 | Example 6 | Example 7 | Example 8 | Example 9 |
|---|---|---|---|---|---|---|---|
| Stirring rate (N) (min$^{-1}$) | 24 000 | 24 000 | 9500 | 24 000 | 24 000 | 20 500 | 20 500 |
| Me$_2$SiCl$_2$ (g/min) | 31.4 | 22.8 | 23 | 25.6 | 25.0 | 22.9 | 22.6 |
| NaOH (g/min) | 19.5 | 16.1 | 16.3 | 16.4 | 15.0 | 16.2 | 16.0 |
| Na$_2$CO$_3$ (g/min) | 5.2 | 3.4 | 3.4 | 5.1 | 4.9 | 3.4 | 3.3 |
| Water (g/min) | 88.4 | 101.5 | 108.3 | 89.5 | 90.0 | 105.4 | 108.5 |
| Buffer (g/min) | 113.0 | 121.0 | 128.0 | 110.9 | 110.0 | 125.0 | 127.8 |
| Total flow rate (g/min) | 144.4 | 143.8 | 151.0 | 136.5 | 135.0 | 148.0 | 150.4 |
| NaOH/HCl (molar) | 1.0 | 1.1 | 1.1 | 1.05 | 0.97 | 1.1 | 1.1 |
| Base/HCl (molar) | 1.1 | 1.2 | 1.2 | 1.15 | 1.09 | 1.2 | 1.2 |
| Residence time (min) | 3.46 | 3.48 | 3.31 | 3.66 | 3.70 | 3.38 | 3.32 |
| Fraction by weight of silanes (Xm) (by weight) | 0.22 | 0.16 | 0.15 | 0.19 | 0.185 | 0.155 | 0.15 |
| OH level (%) | 9.8 | 12.5 | 5.0 | 11.0 | 10.0 | 8.2 | 9.5 |

Figure 2:
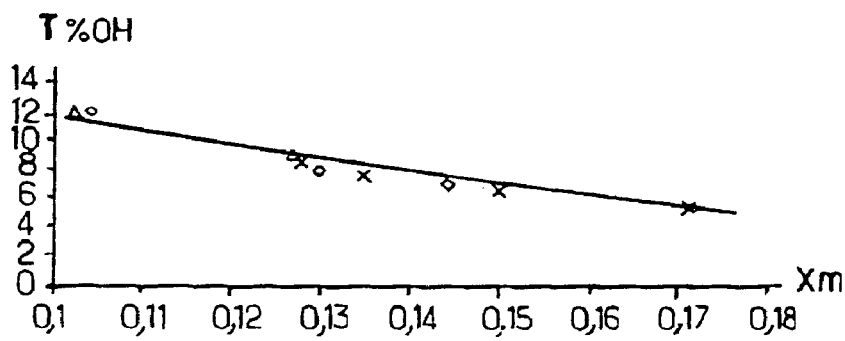
FIG. 2 is a graph showing the effect of the ratio Xm of silanes/aqueous phase on the percentage by weight of hydroxyls in the POSs obtained for the first embodiment.
Figure 3:
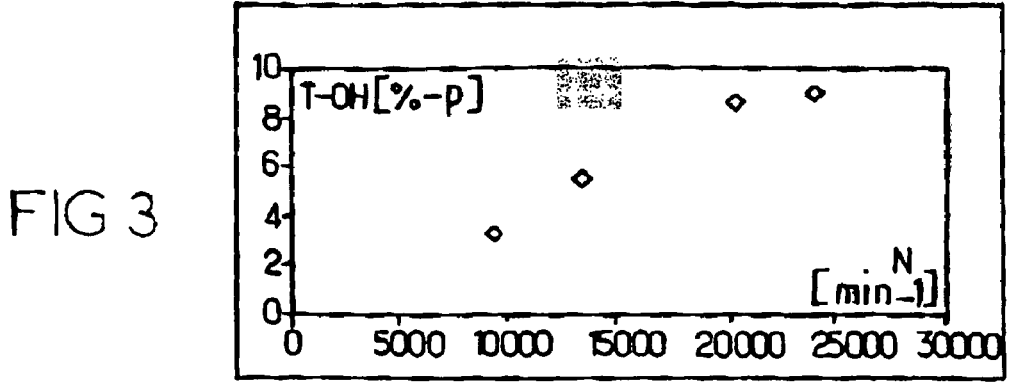
FIG. 3 is a graph showing the effect of the stirring speed N in $min^{-1}$ on the percentage by weight of OH groups in the POSs obtained for the first embodiment.

The appended FIGS. 2 and 3 illustrate the results obtained with regard to the effect respectively of the fraction by weight of silanes Xm and of the stirring speed N on the OH level, $t_{OH}$, as % by weight.

The second parameter governing the quality of the oil is the speed of coalescence. High shearing makes it possible to generate droplets of the organic phase with a size of a few tens of microns: it is then necessary to carry out the chemical reaction before the coalescence of the droplets. It is possible to increase the coalescence time by operating in a more dilute medium. The hydrolysis results produced with various dilutions of the silane phase are presented in Table 4.

3/Example 10

The effect of the stirring speed N (and thus of the shearing) on the quality of the oil obtained is shown in Table 4:

TABLE 4

| | Tests | | | |
|---|---|---|---|---|
| | 10.1 | 10.2 | 10.3 | 10.4 |
| Stirring (rpm) | 24 000 | 20 500 | 13 500 | 9500 |
| Temperature | 40 | 40 | 40 | 40 |
| Me$_2$SiCl$_2$ (g/min) | 23 | 23 | 23 | 23 |
| Buffer (g/min) | 127 | 127 | 127 | 127 |
| Total (g/min) | 150 | 150 | 150 | 150 |
| Residence time (min) | 3.33 | 3.33 | 3.33 | 3.33 |
| Fraction by weight of silanes Xm | 0.153 | 0.153 | 0.153 | 1.153 |
| % OH | 9 | 8.6 | 7.1 | 3.3 |

Each patent, patent application, publication and literature article/report cited or indicated herein is hereby expressly incorporated by reference.

While the invention has been described in terms of various specific and preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a hydrolysis/condensation product that exhibits a level of OH ($t_{OH}$)>5% with respect to the total weight of the hydrolysis/condensation product, by acid catalysis, of silanes bearing hydrolyzable substituents, in a multiphase reaction medium, the process comprising:

(1) forming a reaction medium in a continuous loop reactor comprising contacting said silanes bearing hydrolyzable substituents with water, buffer and neutralizing agent wherein said silanes are introduced into the reactor in an organic phase and the water, buffer and neutralizing agent are introduced into the reaction medium in an aqueous phase, and the aqueous phase and the organic phase are introduced into the reactor at a flow rate wherein the aqueous phase flow rate is between 3.6 and 10 times the flow rate of the organic phase, and the silanes/aqueous phase fraction by weight is greater than or equal to 0.05;

(2) stabilizing the pH of the reaction medium between 7 and 12;

(3) stirring said reaction medium with intensive stirring means to form droplets of organic phase having a Sauter mean diameter $d_{32}$ of less than 500 μm; and (4) separating the aqueous phase from the organic phase, where the organic phase comprises the hydrolysis/condensation products, wherein said silanes are hydrolyzed in the multiphase reaction medium before the coalescence of the organic droplets and the residence time of the reactive medium in the reactor is one minute or less.

2. The process as defined by claim 1, wherein said neutralizing agent comprises at least one base having the formula ROH wherein R is an ionic entity of an alkali metal.

3. The process as defined by claim 1, wherein said buffer comprises a carbonate and/or phosphate and/or borate and/or nitrate.

4. The process as defined by claim 1, wherein the aqueous phase have a saline concentration such that its density is greater than 1.

5. The process as defined by claim 1, said starting silanes having one of the following formulae:

Monosilanes:

$$(X)_a(R)_{4-a}Si \qquad (I)$$

Polysilanes:

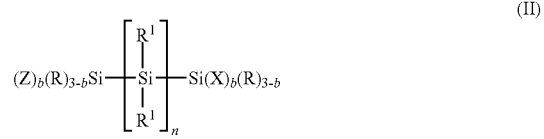

$$(Z)_b(R)_{3-b}Si{-}\!\!\left[\begin{array}{c}R^1\\|\\Si\\|\\R^1\end{array}\right]_n\!\!{-}Si(X)_b(R)_{3-b} \qquad (II)$$

in which:

X independently represents a halogen, alkoxy, or hydroxyl group;

Z independently represents a hydrolyzable group;

R, $R^1$ and R' independently each represent an alkyl, a cycloalkyl, an aryl, an arylalkyl, an acyl, an alkenyl or an alkynyl radical; and a, b and n are positive integers, a=1-4, b=1-3 and n=1-100.

6. The process as defined by claim 1, wherein said hydrolysis/condensation reaction medium is maintained at a temperature less than or equal to 90° C.

7. The process as defined by claim 1 wherein:

the formation of the droplets of organic phase is achieved using a "rotor/stator" stirring means; and wherein the process further comprises providing a feed of halosilanes (organic phase) and a feed of water/buffer system (aqueous phase), such feeds emerging in the region of maximum turbulence generated by the stirring means; and providing for sequential or continuous withdrawal of the two-phase organic phase/aqueous phase mixture generated by the stirring means, such that the residence time is greater than or equal to the reaction time.

8. The process as defined by claim 1, wherein the process is conducted using an apparatus comprising:
a. at least one hydrolysis/condensation reactor;
b. stirring means within said reactor;
c. means for feeding the reactor with organic phase;
d. means for feeding the reactor with aqueous phase;
e. means for withdrawing the two-phase reaction medium after hydrolysis/condensation;
f. means for maintaining the temperature of the reaction medium in the reactor; and
g. organic phase/aqueous phase separation means.

9. The process as defined by claim 8, wherein said at least one means for feeding the reactor with organic phase and with aqueous phase, respectively, comprises at least one outlet positioned such that the organic phase and the aqueous phase flow into and/or are mixed with one another in the stirring region where the power dissipated is at its strongest.

10. The process as defined by claim 8, wherein the formulation of the droplets of organic phase is achieved using an stirring means comprising at least the circulation pump of the loop reactor and optionally at least one other stirring means, wherein the other stirring means is a rotor/stator stirring means or a static mixer stirring means; and said withdrawal means comprise the outlet of the loop.

11. The process as defined by claim 8, wherein the formulation of the droplets of organic phase is achieved using a stirring means comprising at least one rotor/stator combination provided with conically-shaped parts with interlocking teeth.

12. The process as defined by claim 1, wherein the pH of the reaction medium is stabilized between 9 and 11.

13. The process as defined by claim 1, wherein the level of OH by weight ($t_{OH}$) is less than or equal to 15% with respect to the total weight of the hydrolysis/condensation products.

14. A process for the preparation of a hydrolysis/condensation product that exhibits a level of OH ($t_{OH}$)>5% with respect to the total weight of the hydrolysis/condensation product, by acid catalysis, of silanes bearing hydrolyzable substituents, in a multiphase reaction medium, the process comprising:

(1) forming a reaction medium in a continuous loop reactor comprising contacting said silanes bearing hydrolyzable substituents with water, buffer and neutralizing agent wherein said silanes are introduced into the reactor in an organic phase and the water, buffer and neutralizing agent are introduced into the reaction medium in an aqueous phase, and the silanes/aqueous phase fraction by weight is greater than or equal to 0.05;

(2) stabilizing the pH of the reaction medium between 7 and 12;

(3) stirring said reaction medium with intensive stirring means to form droplets of organic phase having a Sauter mean diameter $d_{32}$ of less than 500 μm; and (4) separating the aqueous phase from the organic phase, where the organic phase comprises the hydrolysis/condensation products, wherein said silanes are hydrolyzed in the multiphase reaction medium before the coalescence of the organic droplets and the residence time of the reactive medium in the reactor is one minute or less.

15. The process as defined by claim 1, wherein the silanes/aqueous phase fraction by weight is greater than or equal to 0.10.

16. The process as defined by claim 1, wherein the silanes/aqueous phase fraction by weight is between 0.50 and 2.00.

17. The process as defined by claim 1, wherein said hydrolysis/condensation reaction medium is maintained at a temperature less than or equal to 80° C.

18. The process as defined by claim 1, wherein said hydrolysis/condensation reaction medium is maintained at a temperature between 20° C. and 80° C., inclusive.

* * * * *